United States Patent [19]

Rorie

[11] 4,258,895
[45] Mar. 31, 1981

[54] SUSPENSION MEANS FOR SMOKE EJECTORS

[76] Inventor: Jessie O. Rorie, 1016 W. Borley St., Mishawaka, Ind. 46544

[21] Appl. No.: 40,323

[22] Filed: May 18, 1979

[51] Int. Cl.³ ............................................. F16M 13/00
[52] U.S. Cl. .................................. 248/544; 248/317; 248/672
[58] Field of Search ...................... 248/214, 215, 221.4, 248/228, 233, 317, 339, 340, 341, 359, 637, 672, 544

[56] References Cited

U.S. PATENT DOCUMENTS

| 494,868 | 4/1893 | Kelly | 248/228 X |
|---|---|---|---|
| 1,497,208 | 6/1924 | Calvert | 248/340 X |
| 1,666,907 | 4/1928 | Modine | 248/233 X |
| 1,956,502 | 4/1934 | Galatowitsch | 248/317 X |
| 2,206,328 | 7/1940 | Martinek | 248/340 X |
| 3,314,636 | 4/1967 | McHugh | 248/340 |
| 3,441,147 | 4/1969 | Kelley | 248/228 X |
| 3,556,452 | 1/1971 | Ramsey | 248/228 |
| 3,598,013 | 8/1971 | Broberg | 248/317 X |

Primary Examiner—William H. Schultz
Attorney, Agent, or Firm—Oltsch, Knoblock & Hall

[57] ABSTRACT

A quick acting suspension means for smoke ejectors. Two opposed spring biased hooks are pivotally connected to a handle. The upper edges of the hooks are so shaped and positioned that, when pressed against a trim or frame member above a door or window opening, the hooks separate to pass around the frame member and then engage and anchor upon the frame member above the door or window opening. The handle unit of the suspension means is connected to a smoke ejector housing to facilitate convenience and ease of handling and suspension of the ejector by an unaided fireman.

6 Claims, 5 Drawing Figures

U.S. Patent     Mar. 31, 1981     4,258,895
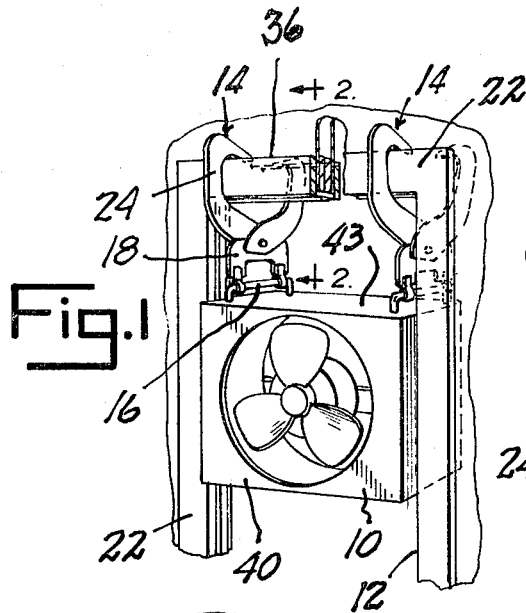
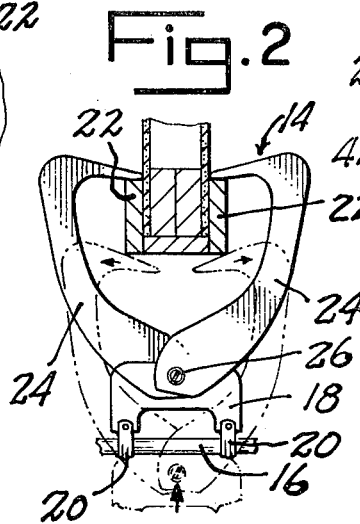
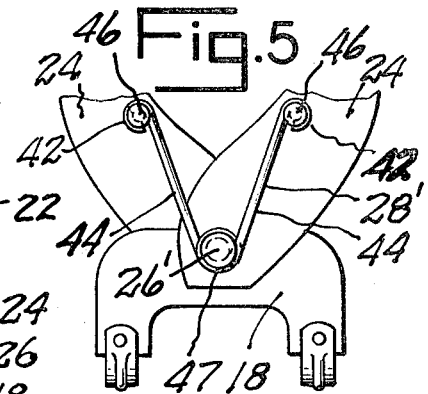
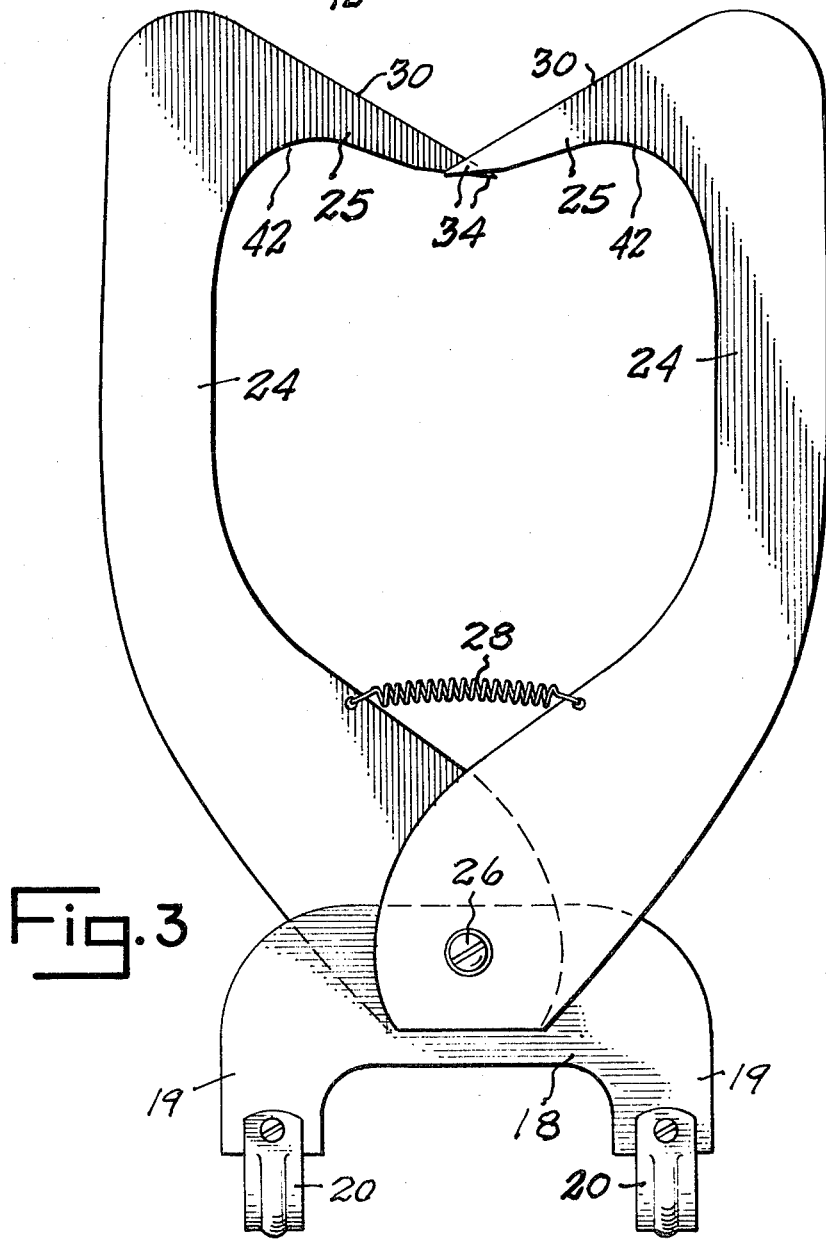
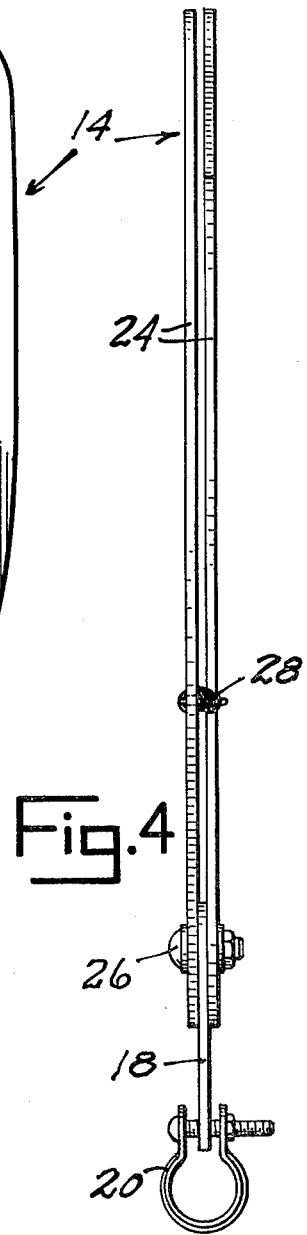

SUSPENSION MEANS FOR SMOKE EJECTORS

SUMMARY OF THE INVENTION

Smoke ejectors are power driven fan units used by firemen. When fighting a fire in a house, building, or other structure, smoke ejectors are used in the openings of the structure to clear smoke from within and thereby allow firemen to enter while enjoying the benefit of a reduced hazard of smoke inhalation.

This invention relates to a means for suspending a smoke ejector in an opening of a building structure.

Present practice in the installation of smoke ejectors commonly includes the use of extensible rigid bars which are mounted in and span a window or door opening and provide means to which hooks or chains connected to an ejector may be anchored and supported. Smoke ejector units commonly weigh about 75 pounds and are usually rectangular, being of dimensions about 15"×18"×19". Because of the weight of the unit and the problem of obtaining adequate support, two firemen are frequently needed to instal an ejector. One man must hold the unit while the other man installs and connects the support bar.

In the suspension means of this invention, two opposed hook parts are pivotally connected to a handle part. The hook parts are spring biased to a normal closed position. The upper edge surfaces of the hooks are so shaped and normally positioned that, when the suspension means is pressed upwardly against the frame or trim member at the top of a door or window opening, the hook parts separate to pass around such frame or trim member and then engage and anchor at the top of the frame or trim, or at the wall above the door or window. Two of the suspension means are pivotally connected to a smoke ejector at opposite parts of the frame thereof. A single fireman may grasp the handles of the suspension means to lift the smoke ejector in a building opening. As the unit is lifted, the hook parts are cammed outwardly to separate as they engage the wall and pass around the trim or frame member above the opening and then spring inwardly to seat at the top of the trim or frame member. Thus, the number of firemen required to instal smoke ejectors is minimal and time is saved. Also, the installation of each ejector requires less time than is required by previous installation methods. Thus the time which elapses from the fire crews' arrival at a blaze until smoke is sufficiently cleared from the structure to allow firemen to enter is reduced compared to prior practices.

A further advantage of this suspension means is that it may be pivoted to the smoke ejector housing to permit the suspension means to lie across the top of the smoke ejector. Two suspension means pivoted at spaced points will overlie each other and lie substantially horizontally across the top of the ejector for compact storage. Further, because the suspension means are attached to the ejector while stored, the problems of locating and assembling suspension devices with an ejector at a fire site are avoided.

It is an object of this invention to provide a suspension means for smoke ejectors by which one man can quickly install an ejector in an opening of a building.

Another object is to provide a suspension means which provides a convenient handle with which to lift a smoke ejector.

Another object is to provide a smoke ejector suspension means which is connected to lie substantially flat against the ejector during storage.

Still another object is to provide a suspension means which is durable, reliable, and easy to instal.

Yet another object is to provide a suspension means which is efficient, econimical, and inexpensive to produce.

Other objects will be apparent from the following specifications.

BRIEF DESCRIPTION OF THE DRAWINGS

FIG. 1 is a partial perspective view of a smoke ejector installed in an opening in a building structure by two suspension means.

FIG. 2 is a sectional view taken along the line 2—2 of FIG. 1 and illustrating in dotted lines a position of the device occurring during installation of the ejector.

FIG. 3 is a frontal view of the suspension means.

FIG. 4 is a side view of the suspension means.

FIG. 5 is a partial frontal view of another embodiment of the suspension means.

DESCRIPTION OF THE PREFERRED EMBODIMENTS

The preferred embodiments illustrated are not intended to be exhaustive nor to limit the invention to the precise forms disclosed. They are chosen and described to best explain the principles of the invention and its application and practical use to thereby enable others skilled in the art to utilize the invention.

One embodiment of this invention is shown in FIGS. 1-4. With reference to FIG. 1, a smoke ejector 10 is installed in an opening 12 of a building structure by two suspension means 14. The smoke ejector 10 has a housing 40 with opposed openings between which a power driven fan 41 is positioned. Housing 40 is preferably provided with spaced hand grips or rails 16 at its opposite upper ends to which the suspension means is attached.

The opening 12 of the building structure is illustrated as provided with conventional trim or frame members 22 at its top and sides, which, in the case of a window opening or door opening, will ordinarily be the woodwork which surrounds the opening at the interior of the wall and the trim member at the exterior of the wall. Openings in interior walls and partitions can also accommodate smoke ejectors if trim parts 22 exist at the top of the opening.

The suspension means 14 has two opposed and complementary rigid and preferably flat hook parts 24 which are pivotally connected together and to a handle 18 at 26. Hooks 24 are normally biased to a closed position, as seen in FIG. 3, by spring 28. In this position the free end portions 25 of the hooks 24 extend toward each other with their hook ends 34 preferably overlapping. The free end portions 25 are preferably tapered, and the outermost edges 30 of portions 25 converge angularly to assume a substantially V-shape or outline as shown in FIG. 3. It will be understood that the edges 30 may be curved if desired.

Handle 18 is preferably of inverted U-shape having a central transverse portion to which hooks 24 are pivoted at 26 and a pair of angularly extending portions 19. Adjacent the end of each handle portion 19 is pivotally connected a clamp member 20 adapted to embrace or freely encircle spaced portions of a rail or hand grip 16 of the housing 40 of the smoke ejector. Clamp members 20 accommodate connection of two suspension members to hand grips at spaced parts of the ejector housing in a manner to swing freely between a storage position lying upon the top 43 of the ejector housing in overlapping position and a use position substantially perpendicular to the top 43 of the housing.

In the use of the device, the user grasps the handles 18 to swing them to vertical position and lifts the unit to position the ejector in the upper part of the building opening in which it is to be installed. When the edges 30 of the hooks of the suspension means engage the surface at the upper edge of a building structure opening, such as trim members 22, and are pushed upward from the dotted position shown in FIG. 2, the hooks 24 are cammed and swing apart. When the hook ends 34 separate and the suspension means is lifted further, the hook ends 34 are biased against and slide across the surfaces of the building trim parts 22. When the hook ends 34 are raised above the top edges 36 of building trim members 22, they are swung toward each other by spring 28 and engage the top edges 36 of the trim members. Additionally, each hook 24 may include a concave inner edge at 42 to permit a hook to engage an overhead object, such as an overhead pipe.

Another embodiment of the suspension means is shown in FIG. 5. In this embodiment, spring 28' biases the hooks 24 together. Spring 28' is generally V-shaped with a loop 42 at each of the distal ends of spring arms 44. Each loop 42 engages a pin 46 attached to a hook 24. A loop 47 of spring 28' at the junction of arms 44 encircles pin 26' which interconnects and pivots hooks 24 and handle 18. Spring loop 47 is fixed to pin 26'. Thus the hooks 24 are maintained by spring 28' in attitudes or orientations extended in opposite and substantially equal angular relation to the handle 18 but are free to swing toward and away from each other. This insures the maintenance of selected relation of the hooks to the handle and thereby prevents simultaneous swinging of the hooks in the same direction to positions which interfere with or make difficult the desired engagement of the hooks with the building trim members.

It is to be understood that this invention is not to be limited to the precise forms disclosed, but that it may be modified within the scope of the appended claims.

What I claim is:

1. A suspension means for smoke ejectors comprising, a handle, a pair of hooks pivoted to said handle on a common axis, each hook having a free end extending toward the other hook, spring means for biasing said hooks to a normal position with the free ends of the hooks adjacent each other, and means for pivotally attaching said handle to a smoke ejector.

2. The suspension means defined in claim 1, wherein the outermost edges of the free ends of said hooks normally converge angularly in the direction of said hook pivot, whereby the opposed hook parts will be separated when said hook outer edges are pressed against an object.

3. The suspension means defined in claim 1, wherein said means for pivotally attaching said handle to a smoke ejector includes a pair of spaced clamp members, each clamp member being adapted to encircle a part projecting from a smoke ejector to accommodate pivotal attachment of said suspension member on said projecting part.

4. The suspension means defined in claim 1, wherein said spring means is a coil spring.

5. The suspension means defined in claim 1, wherein said spring means is a torsion spring.

6. The suspension means defined in claim 5 wherein said torsion spring is substantially V-shaped and is anchored at its ends to said hooks spaced from said hook pivot end and is anchored at said hook pivot in fixed relation to said handle.

* * * * *